Patented Aug. 20, 1940

2,212,461

UNITED STATES PATENT OFFICE 2,212,461

PROCESS OF PREPARING FRENCH FRIED POTATOES

Keith T. Swartz, Chicago, Ill., assignor to Continental Can Company, Inc., New York, N. Y., a corporation of New York No Drawing. Application May 17, 1939, Serial No. 274,259

2 Claims. (Cl. 99—100)

This invention relates to a process of preparing a food product from potatoes and more particularly to a process of preparing French fried shoestring potatoes.

It is generally known that potatoes of the Green Mountain variety grown in Quebec and New Brunswick, and also of the White Cobbler variety grown in the United States contain a very high sugar content. It is also known that potatoes having a high sugar content are not satisfactory for the preparation of French fried shoestring potatoes, that as a result of the sugar, the potatoes become scorched during frying, and develop an un-uniform dark color and burned taste.

It is the object of the present invention to suitably process the potatoes to overcome the above objectionable defects and to produce a resultant product of high quality having a light uniform color and of satisfactory flavor.

The above object is attained by the following process. The potatoes are first peeled, trimmed and cut to the desired size and then immersed in water containing varying amounts of acetic acid. This soaking step is a deviation from the usual procedure and is the means by which the potatoes acquire the desired results forming the objects of the present invention.

The solution used in the present process contains acetic acid in the amounts from 0.1% to 0.7%, the acid being supplied to the soaking water either by glacial acetic acid or distilled vinegar and the length of time of soaking varies from five minutes to five hours. However, I have found that the best results are obtained with a solution having an acidity range of 0.4% to 0.7% and the time range for soaking from four to five hours.

In explanation of the mechanism by which acetic acid prevents the scorching of the potatoes during frying, it should be borne in mind that potatoes contain sugars, such as sucrose, or cane sugar, and so-called reducing sugars of which glucose is an example. In plant tissues such as potatoes, sucrose is in equilibrium to a greater or lesser extent with reducing sugars. Also, each individual reducing sugar exists in more than one chemical form and is able to change from one to another. One of these forms, known as the enol form, is very susceptible to breaking down and charring with heat. The presence of any alkali favors the conversion of the sugar to the enol form, which on the application of heat has a tendency to become caramelized or charred. Therefore, the addition of a small amount of acid, acetic acid actually being used, shifts the equilibrium of the division of the forms of the sugar away from the enol form, and thus reduces the tendency of the sugar to become caramelized on heating. In fact, this equilibrium may have been shifted away from the enol form to the extent of forming a so-called oxonium salt, or a sugar ester, or some other form.

While the preferred acid used in solution is acetic acid, other organic acids such as citric, lactic and tartaric, and inorganic acids such as hydrochloric and sulphuric could be used with equally satisfactory results.

In an actual experiment using the above process, French fried shoestring potatoes prepared by first soaking for five hours in a 0.7% acetic acid solution and fried in "Kremit," a well known shortening made by Armour and Company, for six minutes at 375° F., yielded a product of light, uniform color and of satisfactory flavor. When the soaking in acid was not carried out, the fried potatoes were of an un-uniform dark color and had a burned taste. Although the above experiment was conducted with "Kremit" as the shortening agent, any conventional shortening agent may be used with equally satisfactory results.

In the event it is desired to can the product for commercial distribution, the shoestring potatoes prepared by the process constituting the present inventive concept, may be canned in the conventional procedure.

I claim as my invention:

1. The method of treating sliced potatoes having a high sugar content, which comprises soaking the potatoes in a dilute acid solution having an acid concentration of from 0.1% to 0.7% and soaking for a period from five minutes to five hours whereby to avoid an un-uniform color and burnt taste upon frying.

2. The method of treating sliced potatoes having a high sugar content, which comprises soaking the potatoes in a dilute acid solution having an acid concentration of from 0.4% to 0.7% and soaking for a period from four hours to five hours whereby to avoid an un-uniform color and burnt taste upon frying.

KEITH T. SWARTZ.